(12) United States Patent (10) Patent No.: US 9,179,406 B2
Dasnurkar et al. (45) Date of Patent: Nov. 3, 2015

(54) METHOD AND APPARATUS FOR ENHANCED SLEEP MODE TIERING TO OPTIMIZE STANDBY TIME AND TEST YIELD

(71) Applicant: QUALCOMM Incorporated, San Diego, CA (US)

(72) Inventors: Sachin D Dasnurkar, San Diego, CA (US); Prasannakumar Seeram, San Marcos, CA (US); Prasad Rajeevalochanam Bhadri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 13/653,649

(22) Filed: Oct. 17, 2012

(65) Prior Publication Data

US 2014/0107963 A1 Apr. 17, 2014

(51) Int. Cl.
*G06F 19/00* (2011.01)
*H04W 52/02* (2009.01)

(52) U.S. Cl.
CPC .................................. *H04W 52/0212* (2013.01)

(58) Field of Classification Search
USPC ........................................................ 702/123
See application file for complete search history.

(56) References Cited

U.S. PATENT DOCUMENTS 7,523,151 B1 * 4/2009 Mellott .......................... 708/491
7,810,054 B2 10/2010 Anemikos et al.
7,877,714 B2 * 1/2011 Anemikos et al. ............. 716/134
2009/0164809 A1 * 6/2009 Kim ................................ 713/300
2011/0106497 A1 5/2011 Visweswariah et al.
2012/0121251 A1 * 5/2012 Ticknor et al. ................... 398/16
2014/0089874 A1 * 3/2014 Card et al. ....................... 716/112
2014/0089875 A1 * 3/2014 Arora et al. ..................... 716/112

OTHER PUBLICATIONS

CLI Configuration Guide for Cisco UCS E-Series Servers Integrated Management Controller, First Published: Sep. 7, 2012, Release 1.0, 142 pages.*
Chandra, S, et. al., "Variation-Aware Voltage Level Selection," IEEE Transactions on Very Large Scale Integration (VLSI) Systems, May 5, 2012, pp. 925-936.

* cited by examiner

*Primary Examiner* — Tung S Lau

(57) ABSTRACT

A method and apparatus for optimizing the yield of tested electronics devices is provided. A sample device is characterized to derive a specification for each device in the group. The sample size is chosen to provide reliable data and to minimize the effect of outlier devices on the characterization. After characterization, boundaries are set for the group of tested devices. Boundaries may be set based on voltages optimized for power consumption. The group of devices may be further subdivided into sub-groups based on the results of testing. The sub-groups are each assigned a unique code that reflects the results of the testing. This code is programmed into automated test equipment and is also stored in system software in order to ensure consistent values across the group of tested devices. The automated test equipment and system software are correlated using the same code to ensure higher test yield.

17 Claims, 7 Drawing Sheets

METHOD AND APPARATUS FOR ENHANCED SLEEP MODE TIERING TO OPTIMIZE STANDBY TIME AND TEST YIELD

BACKGROUND

1. Field

The present disclosure relates generally to wireless communication system. More specifically the present disclosure related to methods and apparatus for enhanced sleep mode tiering to optimize standby time and test yield.

2. Background

Wireless communication devices have become smaller and more powerful as well as more capable. Increasingly users rely on wireless communication devices for mobile phone use as well as email and Internet access. At the same time, devices have become smaller in size. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipments, and similar terms.

A wireless communication system may support communication for multiple wireless communication devices at the same time. In use, a wireless communication device may communicate with one or more base stations by transmissions on the uplink and downlink. Base stations may be referred to as access points, Node Bs, or other similar terms. The uplink or reverse link refers to the communication link from the wireless communication device to the base station, while the downlink or forward link refers to the communication from the base station to the wireless communication devices.

Wireless communication systems may be multiple access systems capable of supporting communication with multiple users by sharing the available system resources, such as bandwidth and transmit power. Examples of such multiple access systems include code division multiple access (CDMA) systems, time division multiple access (TDMA) systems, frequency division multiple access (FDMA) systems, wideband code division multiple access (WCDMA) systems, global system for mobile (GSM) communication systems, enhanced data rates for GSM evolution (EDGE) systems, and orthogonal frequency division multiple access (OFDMA) systems.

Aggressive sleep mode voltages are needed in order to maximize battery life of a system on chip (SoC). All SoCs have a specification defined for sleep mode operating voltage and sleep mode voltage. The sleep mode must meet certain specifications. In order to ensure that the specification is met a higher voltage threshold for the sleep mode voltage ends up being used so as to ensure that the greater majority of tested SoCs will meet the voltage specification, as it is easier to meet a higher voltage sleep requirement. Sleep mode voltage affects data retention during the sleep period, and data retention is improved when the voltage is higher. A lower voltage allows for a longer sleep duration. However, because of the desire to utilize most of the SoCs being tested, the sleep mode voltage is set higher than many devices need. This is becoming more and more important as smartphones and other personal devices run greater numbers of applications, which require significant amounts of battery power. Silicon and process variation may not permit the same value to be implemented across all devices because some of the population of devices may fail at that value.

There is a need in the art for methods and apparatus for enhanced sleep mode tiering to optimize time and test yield.

SUMMARY

Embodiments described herein provide a method for optimizing the yield of tested electronics devices. The method begins when a sample device is characterized to derive a specification for each device of the group of tested devices. The sample size is chosen to be large enough to provide reliable data and to minimize the effect of outlier devices on the characterization. Once a sample has been characterized, boundaries are set for the group of tested devices. The boundaries may be set based on voltages that are optimized for power consumption. The group of tested devices is optimized to provide a greater yield of satisfactory devices. As part of the optimization process, the group of devices may be further subdivided into sub-groups based on the results of testing. The sub-groups are each assigned a unique code that reflects the results of the testing. This code is programmed into automated test equipment and is also stored in system software in order to ensure consistent values across the group of tested devices. The automated test equipment and system software are correlated using the same code to ensure higher test yield.

An additional embodiment provides an apparatus for optimizing the yield of tested electronic devices. The apparatus includes a processor for characterizing samples of a group of devices; a processor for measuring voltage; a processor for analyzing and optimizing a distribution of a group of devices; a processor for programming a code; and a processor for correlating sub-group code with voltage values.

A further embodiment provides an apparatus for optimizing the yield of tested electronic devices. The apparatus includes: means for characterizing a sample to derive a specification for each device of a group of tested devices, wherein the sample size is selected to be large enough to provide reliable data; means for setting boundaries for the group of tested devices, wherein the voltage is optimized for power consumption; means for optimizing the group of tested devices to provide greater yield of satisfactory devices, wherein the group of tested devices is placed into sub-groups based on the testing results; means for programming the automated test equipment to provide a code, which code is then coded into the device, and the coding reflects the sub-group to which the device is assigned; means for storing the code to system software to ensure consistent values across the group of tested devices; and means for correlating the automated test equipment and the system software to ensure consistency across the group of tested devices.

A still further embodiment provides a non-transitory computer readable medium containing instructions, which when executed cause a processor to perform the steps of: characterizing a sample to derive a specification for each device of a group of tested devices, wherein the sample size is selected to be large enough to provide reliable data; setting boundaries for the group of tested devices, wherein the voltage is optimized for power consumption; optimizing the distribution of the group of tested devices to provide greater yield of satisfactory devices, wherein the group of tested devices is placed into sub-groups based on the testing results; programming the automated test equipment to provide a code, which code is then coded in the device, wherein the coding reflects the sub-group to which the device is assigned; storing the code to a system software to ensure consistent values across the group of tested devices; and correlating the automated test equipment and the system software to ensure consistence across the group of devices.

DETAILED DESCRIPTION

Figure 1:
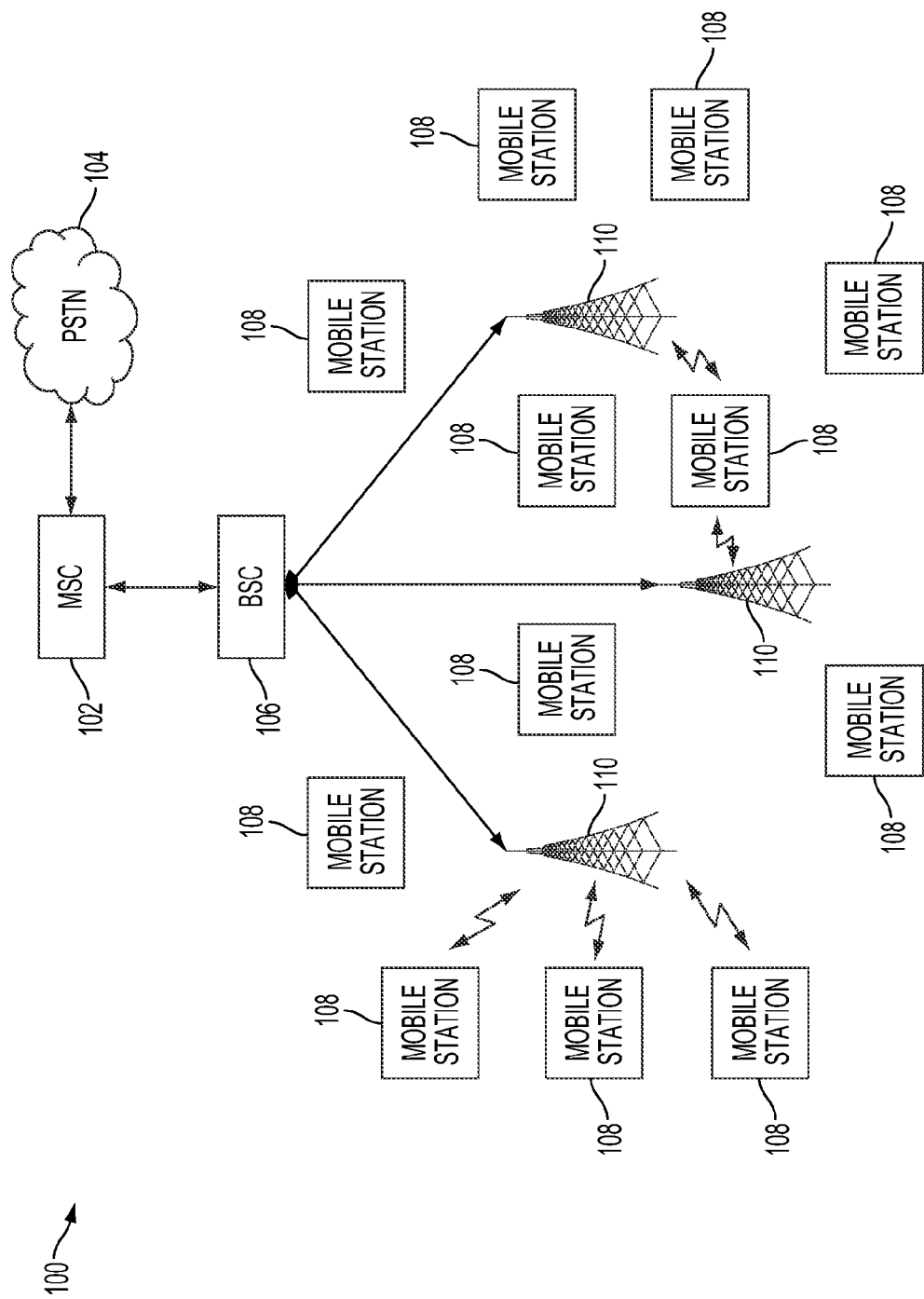
FIG. 1 illustrates one configuration of a wireless communication system, in accordance with certain embodiments of the disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

As used herein, the term "determining" encompasses a wide variety of actions and therefore, "determining" can include calculating, computing, processing, deriving, investigating, looking up (e.g., looking up in a table, a database or another data structure), ascertaining and the like. Also, "determining" can include resolving, selecting choosing, establishing, and the like.

The phrase "based on" does not mean "based only on," unless expressly specified otherwise. In other words, the phrase "based on" describes both "based only on" and "based at least on."

Moreover, the term "or" is intended to man an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA), or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM, and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Disk and disc, as used herein, includes compact disk (CD), laser disk, optical disc, digital versatile disk (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Figure 3:
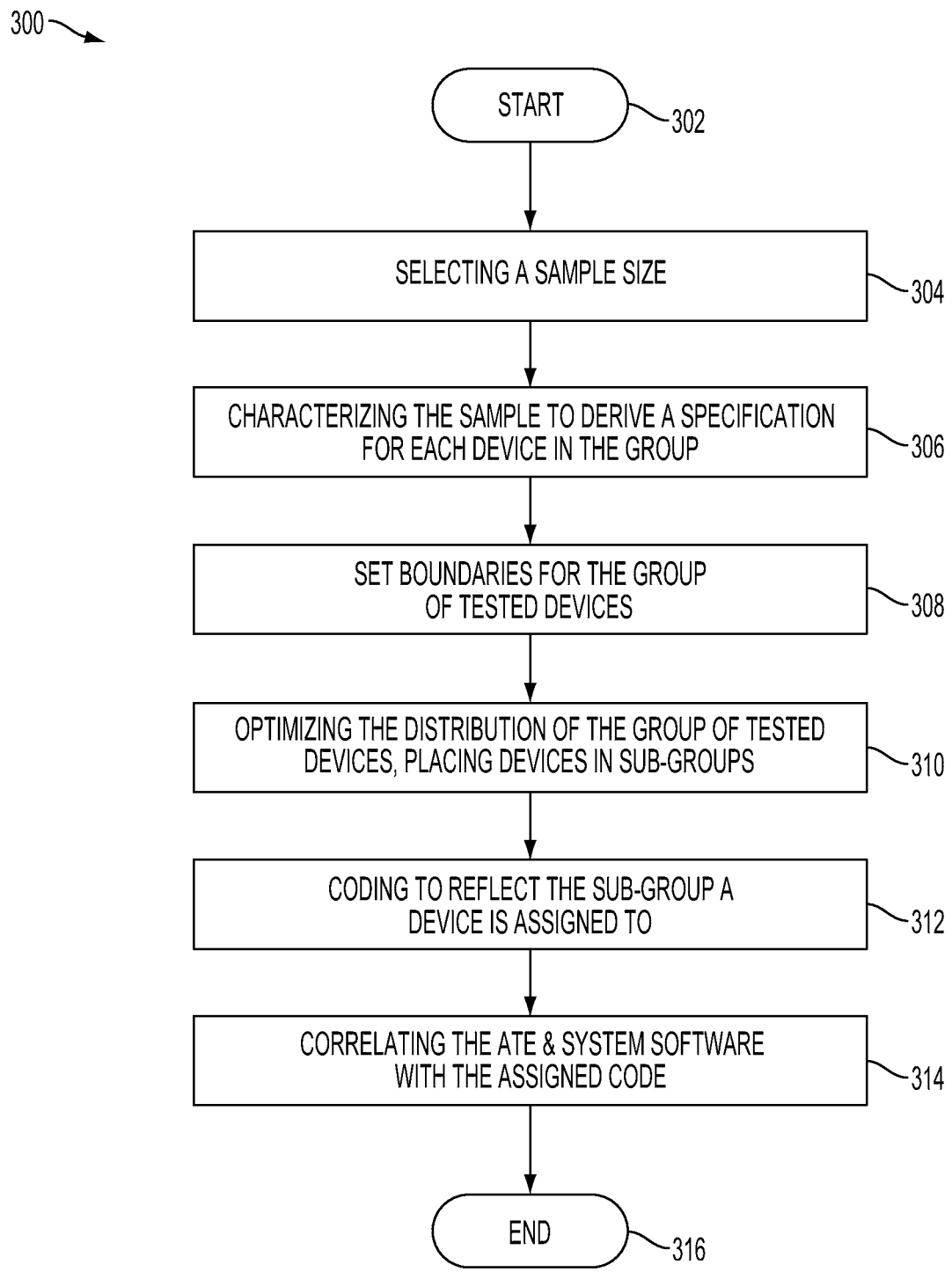
FIG. 3 is a flow diagram of a method for enhanced sleep mode tiering to optimize standby time and test yield in accordance with an embodiment.
Figure 4:
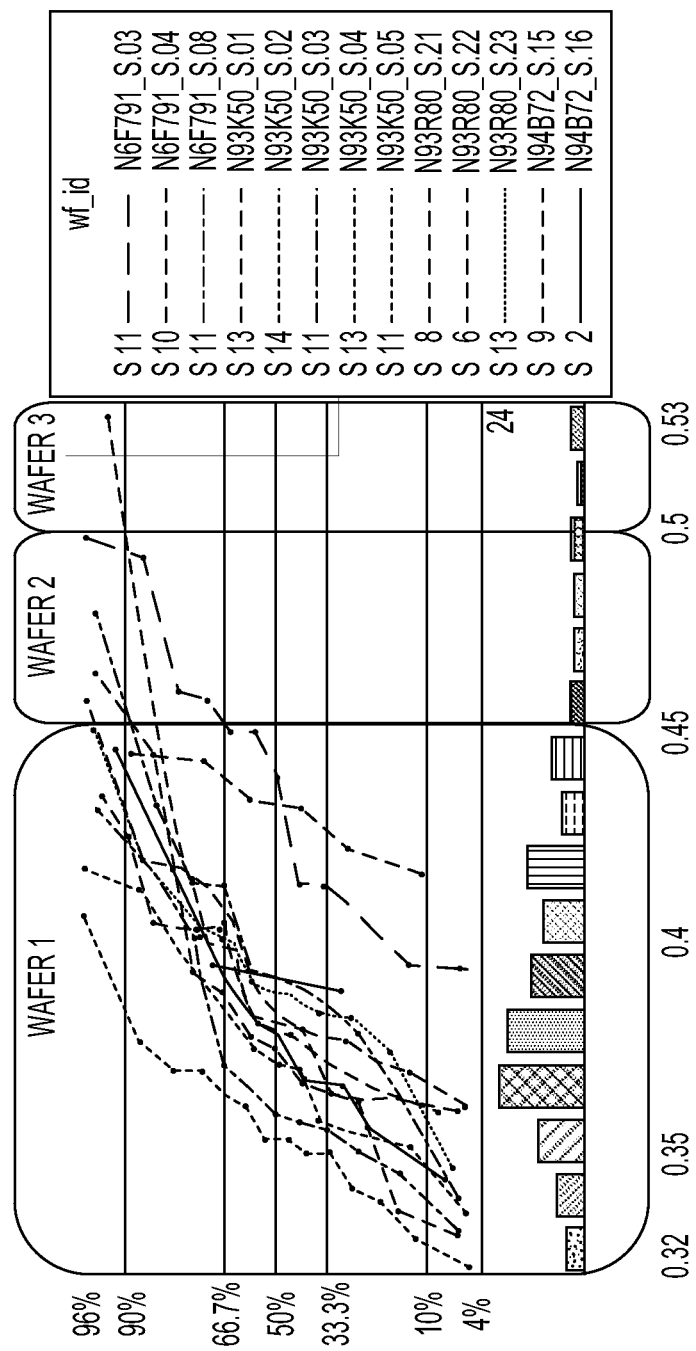
FIG. 4 depicts an example of tiering results for a group of devices tested in accordance with an embodiment.

Further, it should be appreciated that modules and/or other appropriate means for performing the methods and techniques described herein, such as those illustrated by FIGS. 3 and 4, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDAM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various application involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ration (PAPR) because of its inherent single carrier structure. SC-FDMA may be used in the uplink communications where the lower PAPR greatly benefits the mobile terminal in terms of transmit power efficiency.

Embodiments described herein relate voltage buckets for sleep mode voltage settings in SoCs. Aggressive sleep mode voltages may be implemented as each SoC has its particular passing value programmed Yield losses in the production environment may be avoided as not all devices in the population must be identical in performance requirements. Instead, the voltage specification varies with each individual device.

Manufacturing of SoCs uses sub-45 nm process technologies which show high variation in current saturation and current off values ($I_{SAT}/I_{OFF}$) as well as Vt values. These values may vary within a wafer and within a die. As a result, there is a wide variation in sleep mode performance of individual chips or SoCs. Maintaining a consistent voltage across an entire population of SoCs results in yield loss, or provides a pessimistic sleep mode setting that allows all or nearly of the tested devices to pass the criteria.

The tiering scheme proposed herein provides for tiered automated test equipment (ATE) testing of a volume of devices or chips in order to program the ATE passing or acceptable value in terms of a fuse. Software may read out the value of an individual device and then determine the sleep mode voltage based upon the value read for that individual device. The method provides for sleep mode voltage scaling of SoC devices to maximize the ATE test yield while optimizing the population leakage statistics. The method provides various voltage categories or buckets for sleep mode voltage settings. One voltage is set for every SoC to meet. This is done because during testing a range of values if obtained. The benchmark device may actually function at a lower voltage, but the benchmark setting allows a greater number of devices to meet the desired value. Embodiments of the program provide options for setting a value and may choose which value the device may use for operation, possibly allowing a higher value to be used. As a result, the yield rate for SoCs successfully passing testing is increased. The sleep mode is then set for the value providing better usage. The mean voltage value for the population of devices may be lowered in this manner.

FIG. 1 illustrates a wireless system 100 that may include a plurality of mobile stations 108, a plurality of base stations 110, a base station controller (BSC) 106, and a mobile switching center (MSC) 102. The system 100 may be GSM, EDGE, WCDMA, CDMA, etc. The MSC 102 may be configured to interface with a public switched telephone network (PTSN) 104. The MSC may also be configured to interface with the BSC 106. There may be more than one BSC 106 in the system 100. Each base station 110 may include at least one sector, where each sector may have an omnidirectional antenna or an antenna pointed in a particular direction radially away from the base stations 110. Alternatively, each sector may include two antennas for diversity reception. Each base station 110 may be designed to support a plurality of frequency assignments. The intersection of a sector and a frequency assignment may be referred to as a channel. The mobile stations 108 may include cellular or portable communication system (PCS) telephones.

During operation of the cellular telephone system 100, the base stations 110 may receive sets of reverse link signals from sets of mobile stations 108. The mobile stations 108 may be involved in telephone calls or other communications. Each reverse link signal received by a given base station 110 may be processed within that base station 110. The resulting data may be forwarded to the BSC 106. The BSC 106 may provide call resource allocation and mobility management functionality including the orchestration of soft handoffs between base stations 110. The BSC 106 may also route the received data to the MSC 102, which provides additional routing services for interfacing with the PSTN 104. Similarly, the PTSN 104 may interface with the MSC 102, and the MSC 012 may interface with the BSC 106, which in turn may control the base stations 110 to transmit sets of forward link signals to sets of mobile stations 108.

Figure 2:
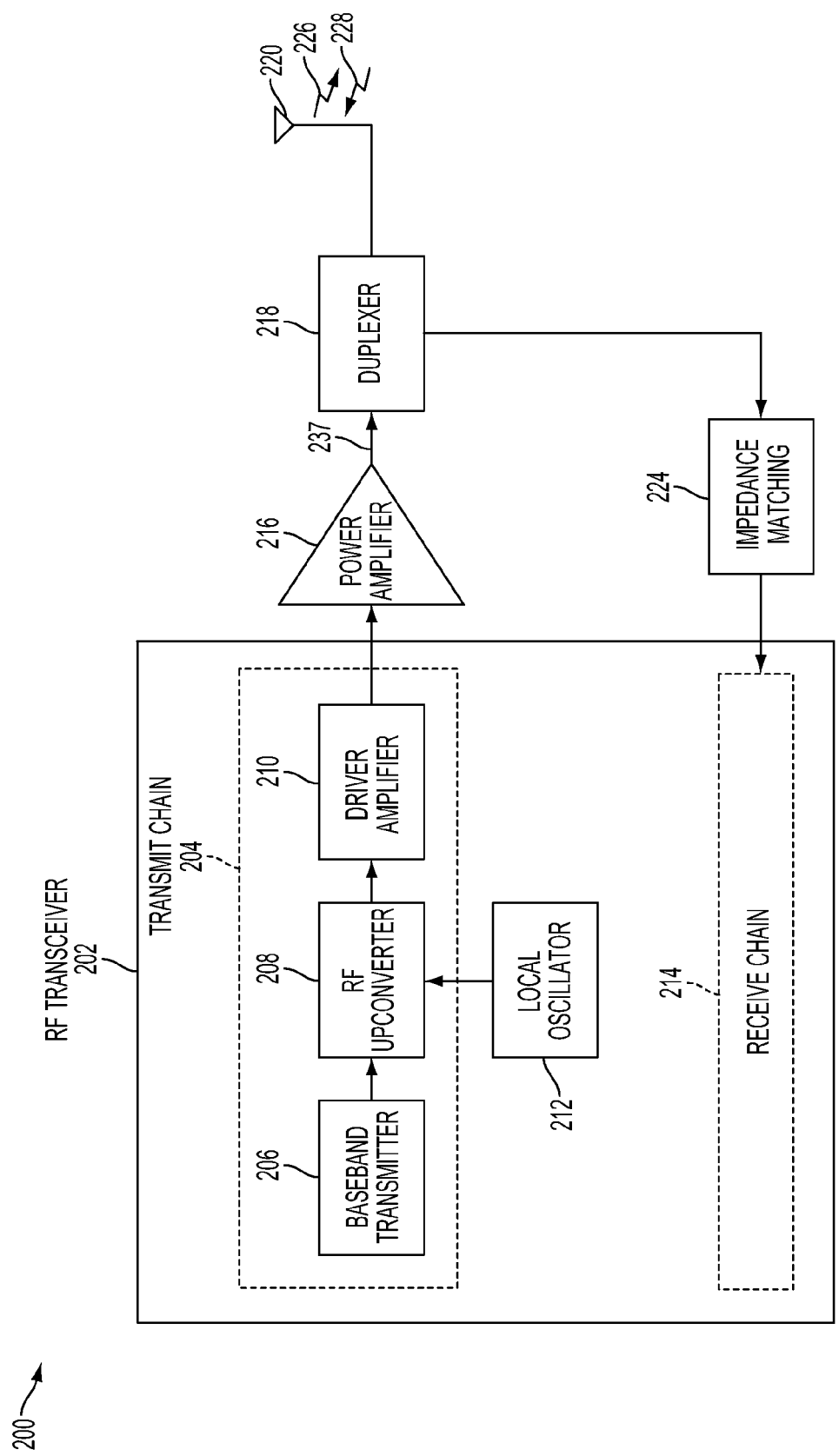
FIG. 2 illustrates a block diagram of an example of electronic components capable of transmitting in accordance with certain embodiments of the disclosure.

FIG. 2 is a block diagram illustrating one example of electronic components, 200, capable of transmitting. The electronic components 200 may be part of a mobile station 108, a base station 110, or any other type of device that may transmit. The electronic components 200 may include a power amplifier (PA) 216. In one scenario the tests may be conducted before the components 200 are marketed, that is, before an end user acquires the components 200. Individual components illustrated in FIG. 2 may also be tested prior to assembly into the portable electronic device. The device may be further tested once assembled. In one example, the configuration 200 may include a radio frequency (RF) transceiver 202. The transceiver 202 may transmit outgoing signals 226 and receive incoming signals 228 via an antenna 220. A transmit chain 204 may be used to process signals that are to be transmitted and a receive chain 214 may be implemented to process signals received by the transceiver 202. An incoming signal 228 may be processed by a duplexer 218 and impedance matching 224 of the incoming signal 228 may occur. The incoming signal 228 may then be processed by the receive chain 214.

Transmit chain 204 prepares signals for transmission by the antenna 220. Transmit chain 204 includes baseband transmitter 206, RF upconverter 208, and driver amplifier 210. The baseband transmitter 206 may also include a filter (not shown) to filter out noise that may be associated with the signal. The signal to be transmitted is prepared by the baseband transmitter 206 and may be upconverted to a high frequency signal by an RF upconverter 208. The upconverter 208 may be under the control of a local oscillator 212. A driver amplifier 210 may amplify the signal and the signal may pass through the PA 216.

Figure 6:
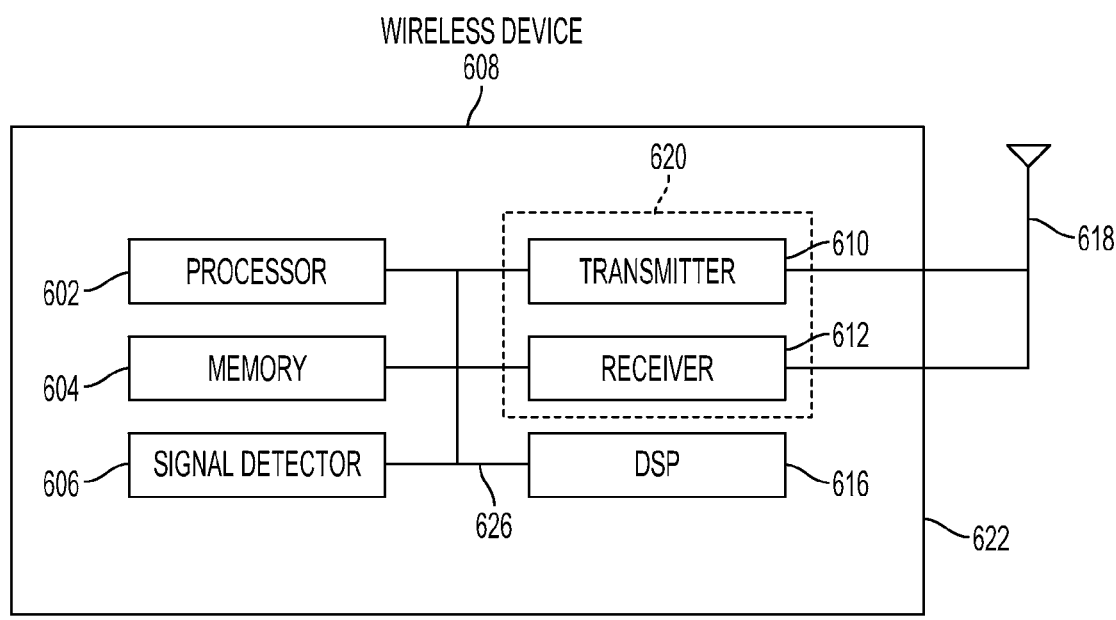
FIG. 6 depicts various components that may be utilized in a wireless communication device according to an embodiment.
Figure 7:
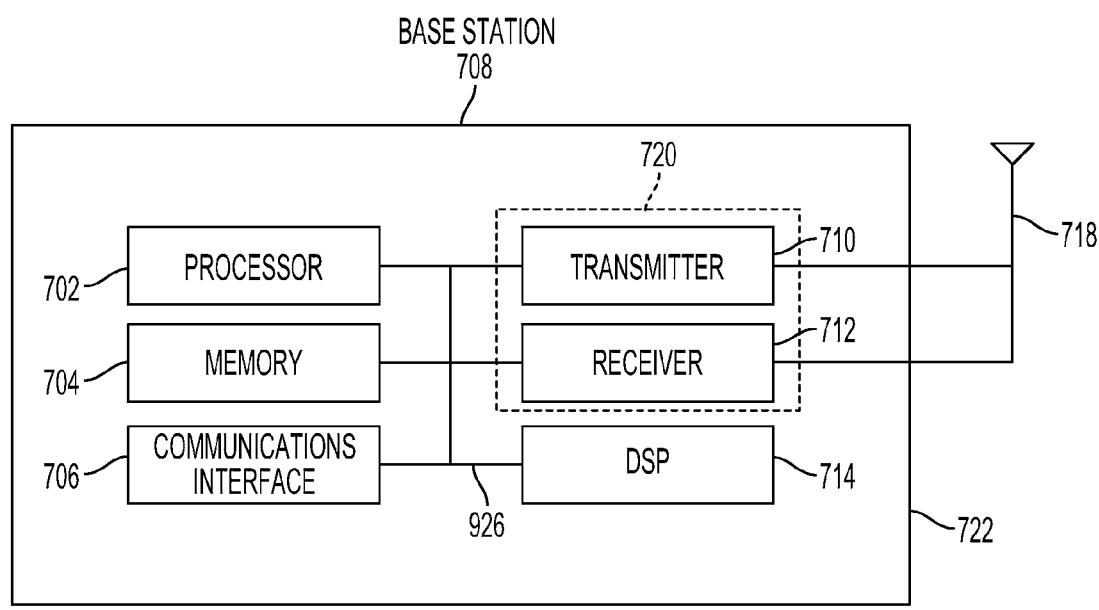
FIG. 7 is a block diagram of a base station in accordance with embodiments of the disclosure.

In one configuration, the signal to be transmitted may be fed through the transmit chain 204 as described above, into the PA 216, and PA output 237 may be passed through a duplexer 218. The duplexed signal 239 may be measured (rather than measuring the output signal 226 from the antenna 220) as part of a testing process for the completed wireless communication device. During the testing of PA 216, measuring equipment 230 may be connected to the output of the duplexer 218 (i.e., the duplexed signal 239). The equipment 230 may include amplitude measuring equipment or functionality 232 and phase measuring equipment or functionality 234. The measuring equipment 230 may be implemented by a computing device that includes a processor, memory, a display, communication interfaces, and the like. The block diagrams of FIGS. 6 and 7 illustrate these components in the context of a wireless device and a base station.

FIG. 3 illustrates the steps of a method of implementing enhanced sleep mode tiering to optimize standby time and test yield according to an embodiment. The method 300 begins at the start block 302. A sample size of a number SoCs is selected for evaluation in step 304. The sample is then characterized through testing to derive a specification for each device in the group in step 306. The specification may include voltage values and standby time values. Once the testing has been completed for the group of devices the boundaries of acceptable performance as set for the group in step 308. These values may be plotted so that the range of values under different voltages and conditions may be compared.

The distribution of the group of devices is then optimized using suitable statistical methodologies in step 310. This optimization may include places groups of the tested devices in sub-groups according to the values observed during testing. These assigned sub-groups may be designated with a specific code for each sub-group. The codes are assigned to the individual devices in step 312. The ATE and system software are then correlated with the assigned code to ensure that the specific performance parameters associated with the code are used in further testing of the assembled device, as well as operation of the device. This correlation occurs in step 314. The process then ends at step 316. In operation the method provides for using the median value for the population in further testing and use.

FIG. 4 is a cumulative probability chart for the method described in FIG. 3. Each horizontal line is one wafer in the family. The three sub-groups A, B, and C, are shown as Group A, Group B, and Group C in FIG. 4. Each of these sub-groups will have a specific code that correlates with specific sleep mode values and standby times.

Figure 5:
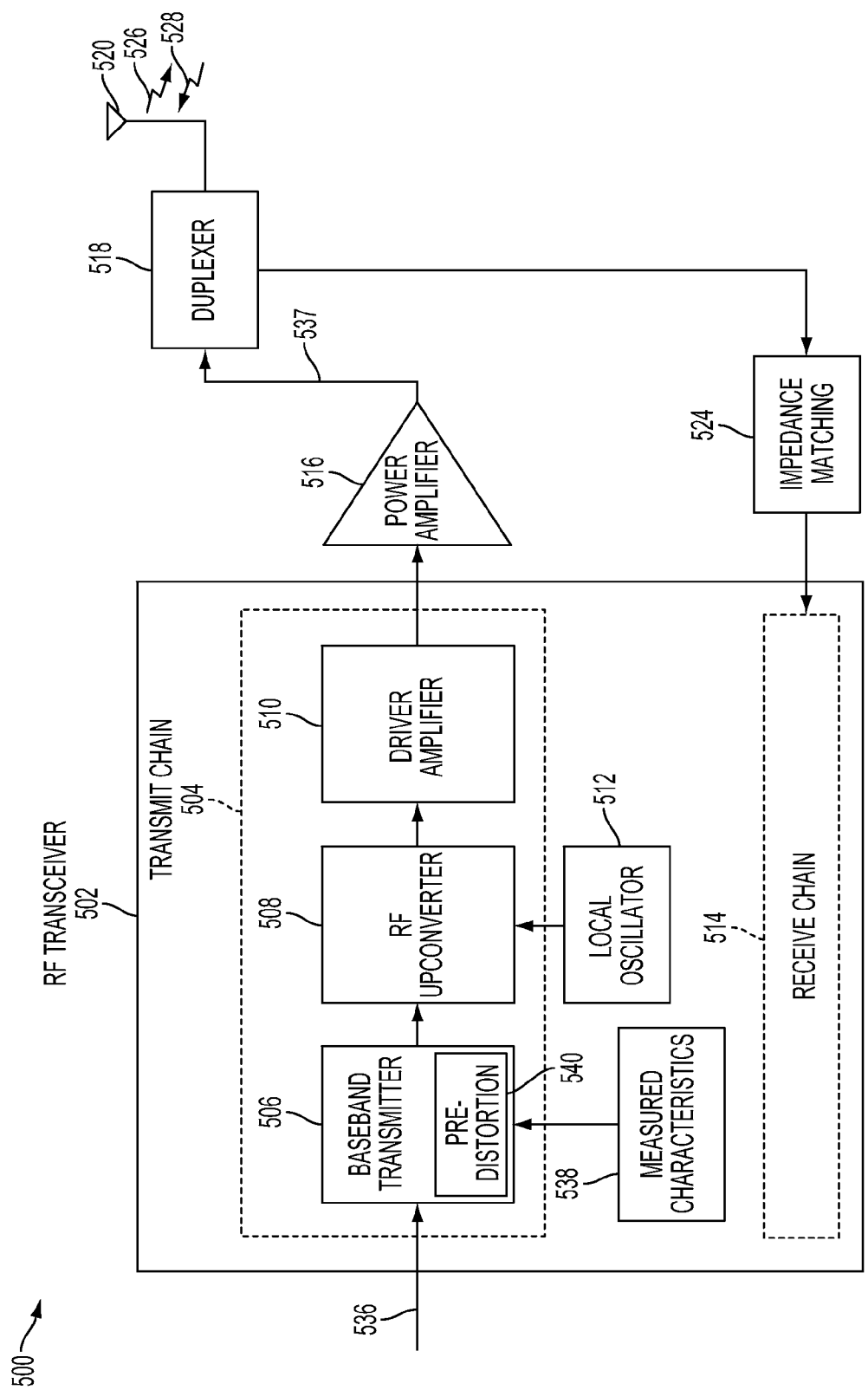
FIG. 5 is a block diagram illustrating one example of a system capable of transmitting after tiering for enhanced sleep mode, according to an embodiment of the disclosure.

FIG. 5 is a block diagram depicting one example of a transmitting system 500 during normal operation. The system 500 may include an RF transceiver 502 for transmitting outgoing signals 526 and receiving incoming signals 528 via an antenna 520. The RF transceiver 502 includes a receive chain 514 that receives the incoming signals 528. For example, the incoming signals 528 may be received by the antenna 520 and processed by duplexer 518. An impedance matching module 524 may match the impedance of the incoming signals 528. The receive chain 514 may further process the incoming signal 528.

A transmit signal 536 may be processed by the transmit chain 504 before being transmitted as an outgoing signal 526. The transmit signal may be input to a baseband transmitter 506 which is part of the transmit chain 504. Pre-distortion techniques may be applied to the transmit signal 536 at the baseband transmitter 506. The pre-distortion techniques may be applied to the transmit signal 536. The pre-distortion may cancel or otherwise compensate for distortion that is added to the signal at a PA 516.

After the signal is processed by the baseband transmitter 506, it may be upconverted to a higher frequency signal by an RF upconverter 508. The upconverter 508 may be controlled by a local oscillator 512. A driver amplifier 510 may amplify the upconverted signal. In addition, the PA 516 may further amplify the signal. Amplification of the signal by the PA 516 may distort the signal. the pre-distortion previously applied to the signal may cancel or otherwise compensate for the distortion added at the PA 516. An amplified signal 537 may be processed by the duplexer 518 and transmitted as a transmit signal 526 to a receiving device via antenna 520.

FIG. 6 illustrates various components that may be utilized in a wireless device 608. The wireless device 608 is an example of a device that may be used with the various systems and methods described herein. The wireless device 608 may be a mobile station 108, a mobile telecommunications device, cellular telephone, handset, personal digital assistant (PDA), etc.

The wireless device 608 may includes a processor 602 which controls operation of the wireless device 608. The processor 602 may also be referred to as a central processing unit (CPU). Memory 604, which may include both read-only memory (ROM) and random access memory (RAM) provides instructions and data to the processor 602. A portion of the memory 604 may also include non-volatile random access memory (NVRAM). The processor 602 typically performs logical and arithmetic operations based on program instructions stored within the memory 604. The instructions in the memory 804 may be executable to implement the methods described herein.

The wireless device 608 may also include a housing 622 that may include a transmitter 610 and a receiver 612 to allow transmission and reception of data between the wireless device 608 and a remote location. The transmitter 610 and receiver 612 may be combined into a transceiver 620. An antenna 618 may be attached to the housing 622 and electrically coupled to the transceiver 620. The wireless device 608 may also include (not shown) multiple transmitters, multiple receivers, multiple transceivers, and/or multiple antennas.

The wireless device 608 may also include a signal detector 606 that may be used to detect and quantify the level of signals received by the transceiver 620. The signal detector 606 may detect such signals as total energy, pilot energy per pseudonoise (PN) chips, power spectral density, and other signals. The wireless device 608 may also include a digital signal processor (DSP) 616 for use in processing signals.

The various components of the wireless device 608 may be coupled together by a bus system 626 which may include a power bus, a control signal bus, and a status signal bus in addition to a data bus. However, for the sake of clarity, the various buses are illustrated in FIG. 6 as the bus system 626.

FIG. 7 is a block diagram of a base station 708 in accordance with one example of the disclosed systems and methods. The base station 708 is an example of a device that may be used with the various systems and methods described herein. Examples of different implementations of a base station 708 include, but are not limited to, an evolved NodeB (eNB), a base station controller, a base station transceiver an access router, etc. The base station 708 includes a transceiver 720 that includes a transmitter 710 and a receiver 712. The transceiver 720 may be coupled to an antenna 718. The base station 708 further includes a digital signal processor (DSP) 714, a general purpose processor 702, memory 704, and a communication interface 706. The various components of the base station 708 may be included within a housing 722.

The processor 702 may control operation of the base station 708. The processor 702 may also be referred to as a CPU. The memory 704, which may include both read-only memory (ROM) and random access memory (RAM), provides instructions and data to the processor 702. A portion of the memory 714 may also include non-volatile random access memory (NVRAM). The memory 704 may include any electronic component capable of storing electronic information, and may be embodied as ROM, RAM, magnetic disk storage media, optical storage media, flash memory, on-board memory included with the processor 702, EPROM memory, EEPROM memory, registers, a hard disk, a removable disk, a CD-ROM etc. The memory 704 may store program instructions and other types of data. The program instructions may be executed by the processor 702 to implement some or all of the methods disclosed herein.

In accordance with the disclosed systems and methods, the antenna 718 may receive reverse link signals that have been transmitted from a nearby wireless device 708. The antenna 718 provides these received signals to the transceiver 720 which filters and amplifies the signals. The signals are provided from the transceiver 720 to the DSP 714 and to the general purpose processor 702 for demodulation, decoding, further filtering, etc.

The various components of the base station 708 are coupled together by a bus system 726 which may include a power bus, a control signal bus, and status signal bus in addition to a data bus. However, for the sake of clarity, the various buses are illustrated in FIG. 7 as the bus system 726.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for optimizing the yield of tested electronic devices, comprising:

characterizing a sample to derive a specification for each device of a group of tested devices;

setting boundaries for the group of tested devices, wherein the voltage is optimized for power consumption;

optimizing a distribution of the group of tested devices, wherein the group of tested devices is divided into subgroups based on testing results;

programming automated test equipment with a code, which code is then coded into each device in the subgroup, wherein the coding reflects the sub-group to which the device is assigned;

storing the code to system software to provide values across the group of tested devices; and correlating the automated test equipment and the system software based on the programmed code.

2. The method of claim 1, further comprising selecting three codes for the sub-groups for the group of tested devices.

3. The method of claim 1, further comprising selecting at least two codes for the sub-groups of the group of tested devices.

4. The method of claim 1, further comprising selecting more than three codes for the group of tested devices.

5. The method of claim 1, wherein the code for each sub-group reflects a standby time value.

6. The method of claim 1, wherein the code for each sub-group reflects a voltage value.

7. An apparatus for optimizing the yield of tested electronic devices, comprising:
   means for characterizing a sample to derive a specification for each device of a group of tested devices;
   means for setting boundaries for the group of tested devices, wherein the voltage is optimized for power consumption;
   means for optimizing a distribution of the group of tested devices, wherein the group of tested devices is divided into sub-groups based on testing results;
   means for programming automated test equipment with a code, which code is then coded into each device in the sub-group, wherein the coding reflects the sub-group to which the device is assigned;
   means for storing the code to system software to provide values across the group of tested devices; and
   means for correlating the automated test equipment and the system software based on the programmed code.

8. The apparatus of claim 7, wherein the means for programming automated test equipment with a code further includes means for selecting three codes for the sub-groups of tested devices.

9. The apparatus of claim 7, wherein the means for programming automated test equipment with a codes further includes means for selecting more than three codes for the sub-groups of tested devices.

10. The apparatus of claim 7, wherein the code for each sub-group reflects a standby time value.

11. The apparatus of claim 7, wherein the code for each sub-group reflects a voltage value.

12. A non-transitory computer-readable medium containing instructions, which when executed cause a processor to perform the steps of:
   characterizing a sample to derive a specification for each device of a group of tested devices;
   setting boundaries for the group of tested devices, wherein the voltage is optimized for power consumption;
   optimizing a distribution of the group of tested devices, wherein the group of tested devices is divided into sub-groups based on testing results;
   programming automated test equipment with a code, which code is then coded into each device in the sub-group, wherein the coding reflects the sub-group to which the device is assigned;
   storing the code to system software to provide values across the group of tested devices; and
   correlating the automated test equipment and the system software based on the programmed code.

13. The non-transitory computer-readable medium of claim 12, further comprising instructions for selecting three codes for the group of tested devices.

14. The non-transitory computer-readable medium of claim 12, further comprising instructions for selecting at least two codes for the group of tested devices.

15. The non-transitory computer-readable medium of claim 12, further comprising selecting more than three codes for the group of tested devices.

16. The non-transitory computer -readable medium of claim 12, further comprising instructions that the code for each sub-group reflect a standby time value.

17. The non-transitory computer-readable medium of claim 12, further comprising instructions that the code for each sub-group reflects a voltage value.

* * * * *